United States Patent [19]

Sauer

[11] 4,418,448
[45] Dec. 6, 1983

[54] CLAMP FOR HOSES OR THE LIKE

[75] Inventor: Heinz Sauer, Ronneburg, Fed. Rep. of Germany

[73] Assignee: Rasmussen GmbH, Maintal, Fed. Rep. of Germany

[21] Appl. No.: 343,740

[22] Filed: Jan. 29, 1982

[30] Foreign Application Priority Data

Jun. 6, 1981 [DE] Fed. Rep. of Germany ....... 3122656

[51] Int. Cl.³ ..................... B65D 63/02; B65D 63/00; A44B 21/00
[52] U.S. Cl. ............................. 24/20 TT; 24/16 PB; 24/484
[58] Field of Search .............. 24/16 PB, 20 R, 20 TT, 24/22, 23 R, 17 A, 17 B, 17 AP, 256, 255 SL

[56] References Cited

U.S. PATENT DOCUMENTS

| | | | |
|---|---|---|---|
| 1,472,966 | 11/1923 | Englund | 24/20 TT |
| 3,154,330 | 10/1964 | Clark et al. | 24/20 TT |
| 3,189,961 | 6/1965 | Heller | 24/20 TT |
| 4,299,012 | 11/1981 | Oetiker | 24/256 |
| 4,319,385 | 3/1982 | Marchou | 24/255 SL |

*Primary Examiner*—Gene Mancene
*Assistant Examiner*—James Hakomaki
*Attorney, Agent, or Firm*—Kontler, Grimes & Battersby

[57] ABSTRACT

A hose clamp wherein a flexible metallic strap has a loop-shaped intermediate portion, an externally toothed first end portion which is overlapped by the intermediate portion and whose teeth mate with the internal teeth of the intermediate portion, and a second end portion whose free end is doubled over itself to form an L-shaped projection having an end face at the inner side of the second end portion. Such end face abuts against the complementary face of a protuberance which is formed on the second end portion by stamping or the like and extends beyond the inner side of the second end portion. The abutting faces greatly enhance the resistance which the projection of the second end portion offers to bending into the general plane of the second end portion during tensioning of the intermediate portion around a hose or the like.

7 Claims, 4 Drawing Figures

CLAMP FOR HOSES OR THE LIKE

BACKGROUND OF THE INVENTION

The present invention relates to clamps for hoses or the like. More particularly, the invention relates to improvements in clamps of the type wherein a loop-shaped intermediate portion of a flexible metallic or plastic strap is adapted to be placed around a portion of a hose or a like body consisting of deformable material and the intermediate portion can be tightened around the hose to prevent leakage between the internal surface of the hose and the external surface of a nipple or a like device which extends into the end portion of the hose. Still more particularly, the invention relates to improvements in clamps of the type wherein the loop-shaped intermediate portion can be tightened around a hose without resort to screws or other types of threaded tightening elements.

It is already known to provide a clamp of the above outlined character with a loop-shaped intermediate portion which has a row of inwardly extending teeth mating with one or more external teeth on a first end portion of the strap. A second end portion of the strap can be pulled in a direction to reduce the size of the loop-shaped intermediate portion, i.e., to tighten the intermediate portion around one end of a hose or the like. When the tightening action is not produced in response to rotation of a screw (note commonly owned U.S. Pat. No. 4,244,088 granted Jan. 13, 1981 to Heinz Sauer) which is rotatable in a bracket or lug of the second end portion and meshes with an internally threaded lug on the intermediate portion of the strap, the second end portion is normally formed with an outwardly bent lug which can be urged in a direction to reduce the size of the intermediate portion whereby the teeth of the intermediate portion slide along the tooth or teeth of the first end portion until the application of the tightening force is terminated, until the lug of the second end portion breaks away, or until the lug is bent into the general plane of the second end portion so that it cannot offer an effective surface for the application of a tensioning force. Reference may be had to commonly owned copending U.S. patent application Ser. No. 258,375 filed Apr. 28, 1981 by Heinz Sauer et al. (corresponding to German Offenlegungsschrift No. 30 17 178). This copending application discloses a clamp which does not employ a tightening screw and wherein the lug constitutes an outwardly bent free end or tip of the second end portion of the strap. The thickness of the bent-over lug is identical with the thickness of the remaining parts of the strap. It is also proposed to reinforce the lug by ribs or webs in the region where the lug extends from the remaining part of the second end portion of the strap. Such webs or ribs stiffen the lug and enable it to stand more pronounced stresses prior to yielding and moving into the general plane of the second end portion. It has been found that such lugs are often incapable of standing the stresses which must be applied to adequately tighten the loop-shaped intermediate portion of the strap around a hose or the like. Moreover, the application or making of webs or ribs involves additional expenditures in time and material so that the cost of such clamps is at least as high as that of clamps which employ screws or analogous threaded tightening elements.

OBJECTS AND SUMMARY OF THE INVENTION

An object of the invention is to provide a novel and improved clamp for hoses or the like which is simpler and less expensive but just as reliable and easy to manipulate as heretofore known clamps.

Another object of the invention is to provide a clamp which need not be provided with a screw or an analogous threaded tightening element and wherein the projection of the second end portion of the strap is constructed and configured in such a way that it can stand bending stresses greatly exceeding those which can be withstood by the lugs of heretofore known clamps.

A further object of the invention is to provide the strap of a hose clamp with novel and improved means for facilitating the application of pronounced tensioning stresses without premature bending or other deformation of those parts which take up such stresses during tightening of the loop-shaped intermediate portion of the strap around a hose or the like.

An additional object of the invention is to provide novel and improved means for preventing premature bending of projections on the second end portions of straps forming part of hose clamps or the like.

Another object of the invention is to provide a hose clamp which can be tightened by resorting to relatively simple and readily available tools.

An additional object of the invention is to provide a hose clamp which can be furnished in a variety of sizes and which can be mass-produced by resorting to available machinery.

The invention is embodied in a flexible clamp for hoses or the like (e.g., a clamp which can secure the end portion of a hose to a nipple so as to prevent leakage of fluid from the passage which is defined by such hose and the nipple). The clamp comprises an elongated strap (e.g., a metallic strap of substantially constant width) including a toothed loop-shaped intermediate portion, a toothed first end portion which is overlapped by and meshes with the intermediate portion, and a second end portion extending from the intermediate portion and comprising a bendable tensioning projection (which may constitute the free end of the second end portion) having a first face extending substantially transversely of the strap. The second end portion of the strap is further provided with a second face which is adjacent to the first face and serves to oppose bending of the projection when the projection is urged in a direction to reduce the size of the intermediate portion, i.e., in a direction to tighten the strap around a hose or the like.

The projection of the second end portion of the strap preferably extends outwardly in a direction away from the intermediate portion, and the second end portion preferably includes a protuberance extending toward the intermediate portion and defining the second face. For example, the projection may constitute a folded-over (substantially L-shaped) part of the second end portion and may include two mutually inclined legs one of which extends outwardly and the other of which includes a panel disposed at that side of the second end portion which faces the intermediate portion of the strap. The first face is then provided on the other leg of the folded-over part of the second end portion.

The aforementioned protuberance preferably constitutes an integral part of the second end portion of the strap and can be formed by stamping or punching, i.e., it can be offset with reference to the general plane of the second end portion so as to present a shoulder or surface which constitutes the aforementioned second face of the means for opposing bending or flexing of the projection when the latter is subjected to the action of a force tending to reduce the size of the loop-shaped intermediate portion of the strap.

The second end portion of the strap can be formed with a slot flanking a portion of the protuberance. Alternatively, the protuberance can be formed by the simple expedient of providing one side of the second end portion with a suitable recess which entails the formation of a complementary bulge or protuberance at the other side of the second end portion.

The second end portion can be provided with a shoulder which extends transversely across the full width of the strap and constitutes the second face. Such shoulder is preferably provided at that side of the second end portion which faces the loop-shaped intermediate portion of the strap.

The first end portion of the strap is preferably provided with suitably configured guide means defining a preferably shallow channel through and beyond which the second end portion of the strap extends.

The first end portion of the strap is preferably further provided with an external abutment (e.g., a lug which is punched or stamped from the general plane of the first end portion toward the adjacent side of the second end portion) for the application thereagainst of one portion of a suitable tensioning tool another portion of which bears against the projection of the second end portion for the purpose of reducing the size of the intermediate portion.

The novel features which are considered as characteristic of the invention are set forth in particular in the appended claims. The improved clamp itself, however, both as to its construction and the mode of manipulating the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
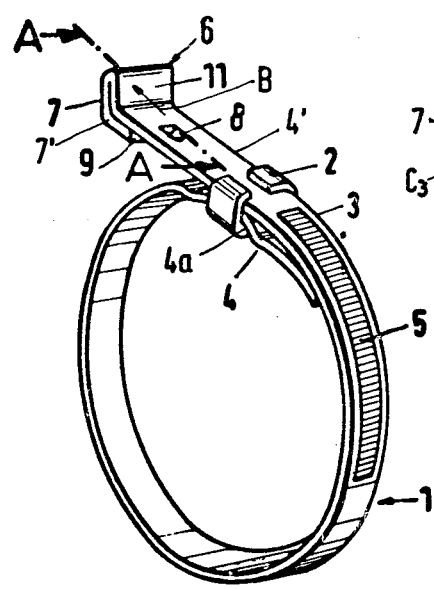
FIG. 1 is a perspective view of a clamp which embodies one form of the invention.
Figure 2:
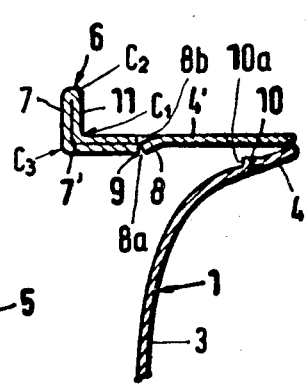
FIG. 2 is a fragmentary sectional view as seen in the direction of arrows from the line A—A of FIG. 1.

Referring first to FIGS. 1 and 2, there is shown a hose clamp which comprises an elongated flexible metallic strap 1 including a loop-shaped intermediate portion 3 having a row of inwardly extending teeth 5, a first end portion 4 which is overlapped by the intermediate portion 3 and has one or more external teeth (not specifically shown) in mesh with the teeth 5 so as to normally prevent an increase in the size of the portion 3, and a second end portion 4' which is constructed in accordance with a feature of the present invention. The first end portion 4 is formed with or connected to a substantially C-shaped guide 2 defining a relatively shallow channel through and beyond which the second end portion 4' extends substantially tangentially of the loop-shaped intermediate portion 3. The guide 2 can constitute a discrete (separately produced) part which is soldered, welded, riveted or otherwise fixedly secured to the end portion 4. In order to further reduce the likelihood of slippage or detachment of the guide 2 from the first end portion 4, the inner side of the latter can be provided with a shallow transversely extending groove 4a into which the web (median portion) of the guide 2 extends. The groove 4a can be formed by bending the material of the end portion 4 in two spaced-apart regions extending transversely of the strap 1. The tooth or teeth of the first end portion 4 extend outwardly so that each such tooth can engage one of the adjacent inwardly extending teeth 5 on the intermediate portion 3. The guide 2 maintains the teeth 5 in engagement with the external teeth of the first end portion 4, especially when the intermediate portion 3 is placed around the end portion of a hose which is to be biased against a nipple extending into such end portion of the hose. The teeth on the portions 3 and 4 can be formed by stamping, punching or by resort to an analogous technique. If the clamp is to be opened up, the external tooth or teeth of the first end portion must be disengaged from the adjacent teeth 5 of the intermediate portion 3 so as to allow for an enlargement of the portion 3, i.e., to increase the size of the loop which is to be placed around the end portion of a hose or the like.

The second end portion 4' of the strap 1 is formed with a substantially L-shaped projection 6 which constitutes a folded-over or doubled portion of the material of the strap 1. One leg 7 of the projection 6 extends substantially at right angles to the general plane of the end portion 4' and outwardly, i.e., in a direction away from the loop-shaped intermediate portion 3. The other leg 7' of the projection 6 has a panel which is adjacent to the underside of the second end portion 4' (namely, to that side which faces toward the loop-shaped intermediate portion 3) and has a transversely extending face 9 constituting the end face of the panel. As shown in FIG. 2, the face 9 is immediately adjacent to the face 8a of a protuberance 8 which is a tongue that is stamped or punched from the material of the end portion 4' and is bounded by three slits 8b. All in all, the projection 6 exhibits three corner portions (at C1, C2 and C3) and its face 9 abuts against the face 8a to thus reduce the likelihood of premature bending of the leg 7 at the corner portions C1 and C3 so as to move it into the general plane of the end portions 4', i.e., into the plane of the leg 7'. When the intermediate portion 3 of the clamp is to be tightened around the end portion of a hose or the like, the operator in charge applies one portion of a tool (not shown) against the surface 10a of an abutment 10 of the first end portion 4 while the other portion of such tool bears against the surface 11 of the leg 7 to urge the leg 7 in the direction of arrow B and to thereby cause the teeth 5 of the intermediate portion 3 to slide along the teeth of the first end portion 4. Such sliding movement is terminated when the operator so decides or when the leg 7 of the projection 6 is caused to change its orientation so as to lie in the general plane of the end portion 4' in spite of the fact that the face 8a of the protuberance 8 opposes any and all movements of the face 9 toward the guide 2, i.e., toward the intermediate portion 3. The face 8a is preferably parallel or substantially parallel to the face 9. The width of the protuberance 8 can be selected practically at will, i.e., such width can come close to or it may constitute a small fraction of the width of the second end portion 4'. In this manner, the manufacturer of the clamp can select the force which must be applied in the direction of arrow B in order to flex the leg 7 at C1 and C3 in order to terminate the tensioning of the intermediate portion 3, i.e., to terminate the reduction of the size of the loop which is formed by the portion 3.

In order to make the protuberance 8, a suitable cutting tool can be employed to make a single slit 8b in the second end portion 4' along the face 8a prior to bending of the adjacent part of the end portion 4' in a direction from the outer toward the inner side thereof.

The abutment 10 can be formed in the same way as to projection 8, i.e., it may extend from the general plane and beyond the outer side of the first end portion 4 so that it offers a shoulder or surface 10a for engagement with one portion of the aforementioned tool. Such tool urges the entire second end portion 4' substantially tangentially of the loop-shaped intermediate portion 3 by having another portion thereof bear against the leg 7 in the direction of arrow B. The other or second portion of the tool then bears against the aforementioned side or surface 11 of the leg 7. When the force which acts in the direction of arrow B reaches a preselected value, the leg 7 of the projection 6 yields by bending at C1 and C3 so that it moves into the plane of the leg 7' and the application of tensional stress to the intermediate portion 3 is ceased at a time when this intermediate portion is held in requisite clamping engagement with the respective end portion of a hose so that the portion 3 prevents leakage between the internal surface of such end portion of the hose and the external surface of a nipple onto which the end portion of the hose has been slipped prior to tensioning of the intermediate portion 3. Once the leg 7 has been flexed into the plane of the leg 7', the respective portion of the tool simply slides over the bent-over leg 7 and this indicates to the operator that the clamping or tensioning operation is completed. The material of the second end portion 4', the manner of bending the tip of this end portion, the dimensions of the legs 7, 7' and the area of the face 8a can be readily selected in such a way that the leg 7 is bent into the plane of the leg 7' when the clamping force acting upon the end portion of a hose or the like reaches a preselected value. This ensures that the force with which the intermediate portion 3 bears against the end portion of a hose cannot exceed a preselected limit which would entail damage to or complete destruction of the material of the hose or a tearing of the strap 1. Another advantage of the feature that the leg 7 is flexed into the plane of the leg 7' when the requisite clamping force is applied is that the tool is automatically disengaged from the projection 6 as well as that an attendant can immediately ascertain (by noting that the leg 7 is coplanar or nearly coplanar with the leg 7') that the clamp properly engages the end portion of a hose or the like.

While the tool applies a force which tends to lengthen the end portion 4' at the expense of the loop-shaped intermediate portion 3, the face 9 bears against the face 8a with the result that such faces prevent immediate or premature flexing of the leg 7 in the region of the corner portions C1 and C3. In other words, the protuberance 8 prevents the inner panel of the leg 7' from moving toward the guide 2 so that the originally L-shaped projection 6 offers a much greater resistance to deformation than if the protuberance 8 and its face 8a were omitted. Consequently, by the simple expedient of providing the second end portion 4' with the protuberance 8 having a face 8a which abuts against the face 9 of the leg 7', one can greatly increase the resistance which the projection 6 offers to deformation so that the sealing action of the intermediate portion 3 can be increased in an extremely simple and inexpensive way. The protuberance 8 can be provided at a fraction of the cost of screws and mating portions on the end portion 4 or 4', i.e., the improved clamp is just as satisfactory as but much less expensive than conventional clamp which employ externally and internally threaded members to tighten the intermediate portion of the strap around a hose or the like.

It will be noted that the effective thickness of the projection 6 is twice the thickness of the major portion of the strap 1, i.e., twice the thickness of the end portion 4 and/or intermediate portion 3. This is due to the fact that the projection 6 is formed by bending the material of the tip of the end portion 4' over itself to form two legs 7 and 7' each of which consists of two closely adjacent panels lying flat against one another. Since the face 9 of the inner panel of the leg 7' abuts against the face 8a of the protuberance 8, the panels of the legs 7 and 7' cannot be readily shifted or slid relative to one another when the tool applies a force against the surface 11 (note the arrow B) so that the projection 6 can stand pronounced deforming stresses before the leg 7 begins to yield in response to bending in the region of the corner portions C1 and C3. That part of the projection 6 which is adjacent to the corner portions C1 and C3 is subjected primarily to shearing stresses which also contributes to more pronounced resistance of the leg 7 to flexing into the plane of the leg 7'. In other words, the improved strap 1 (and more particularly the projection 6 of the end portion 4') exhibits a surprisingly high resistance to bending in the region of the corner portions C1 and C3, even though the leg 7 and/or 7' need not be reinforced by ribs, webs or like parts whose application and/or making involves substantial expenditures in time, machinery and material. The improved clamp is simpler and less expensive but just as strong or even stronger than heretofore known clamps having straps made of the same material and of the same thickness and width. This is attributable to the fact that the thickness of the projection 6 is twice that of the remainder of the strap 1 and that the face 9 of this projection abuts against the face 8a of the protuberance 8.

Figure 3:
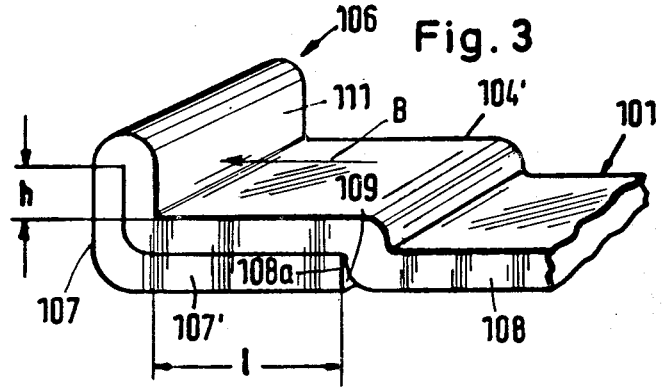
FIG. 3 is a greatly enlarged perspective view of the second end portion of the strap in a modified clamp wherein the second face is formed by a shoulder of the second end portion.

FIG. 3 shows a modified second end portion 104' whose projection 106 is practically identical with the projection 6 shown in FIGS. 1 and 2. The difference between the embodiment of FIGS. 1-2 and the embodiment of FIG. 3 is that the second face of the end portion 104' is a shoulder 108a extending all the way between the two edge faces of the strap 101 and formed by appropriate deformation of the material of the strap in a suitable bending machine or the like. There is no need to form the end portion 104' with one or more slits and to thereupon shift the material of the end portion 104' adjacent to or between such slits. The shoulder 108a is formed on a portion 108 of the end portion 104' which is offset with reference to the outer panel of the leg 107' and is practically or exactly coplanar with the outer panel of the leg 107'. The configuration of the leg 107 is similar to or identical with that of the leg 7; the reference character 111 denotes that surface of the leg 107 which can be engaged by a portion of a tool which also bears against an abutment corresponding to the abutment 10 of FIG. 2 during tensioning of the loop-shaped intermediate portion of the strap 101 around the end portion of a hose, not shown. An advantage of the clamp which embodies the structure of FIG. 3 is that it can be manufactured at a very low cost and also that the face or shoulder 108a extends all the way across the strap 101 so as to offer a surprisingly high resistance to movement of the face 109 in a direction to the right, as viewed in FIG. 3, when a force (arrow B) acts against 111 of the leg 107. Furthermore, the pressure per unit area of the face 109 and shoulder 108a is less than the pressure per unit area of the relatively small face 8a and the abutting portion of the face 9.

Figure 4:
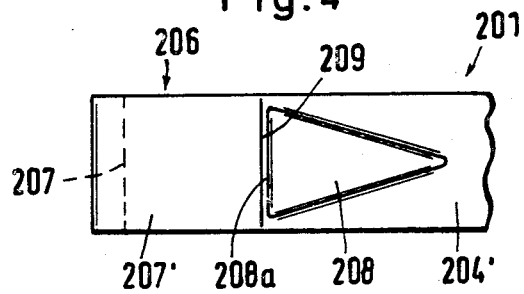
FIG. 4 is a fragmentary plan view of the inner side of the second end portion of a strap forming part of a further clamp constituting a modification of the clamp shown in FIGS. 1 and 2.

FIG. 4 shows the end portion 204' of a strap 201 wherein the protuberance 8 of FIGS. 1 and 2 is replaced by a protuberance 208 in the form of a bulge formed by a suitable tool and not bounded by one or more slits. Thus, the working end of a suitable tool is caused to depress a portion of the material of the end portion 204' in a direction toward the inner side of such end portion so that the resulting recess at the outer side entails the formation of the bulge or protuberance 208 whose side 208a constitutes a face located in the path of rightward movement of the face 209 on the projection 206 which is preferably identical with the projection 6 shown in FIGS. 1 and 2. The bulge or protuberance 208 preferably resembles a wedge so that the side 208a is elongated and more or less flat and can offer adequate resistance to rightward movement of the complementary face 209. The making of the end portion 204' is less expensive than that of the end portion 4'; however, it is simpler to expel the protuberance 8 from the general plane of the end portion 4' because this protuberance is flanked by the slit 8b.

By way of example, the strap 1, 101 or 201 can have a thickness which is a fraction of one millimeter (e.g., 0.7 mm), the width of the strap 1, 101 or 201 can be less than one centimeter (e.g., 9 mm), the height h (see FIG. 3) of the leg 7, 107 or 207 can be in the range of one millimeter or a few millimeters (e.g., 1.4 mm), and the length 1 (see FIG. 3) of the leg 7', 107', or 207' can be approximately twice the height h (e.g., approximately 2.5 mm).

Each of the improved clamps exhibits the advantage that it need not employ any screws or analogous threaded tightening means. Furthermore, the leg 7, 107 or 207 is merely bent rather than broken away when the aforementioned tool applies the required tensioning force; therefore, the end portion 4', 104' or 204' does not exhibit any sharp edges which could injure the attendant or another person manipulating the connection which includes the clamp. The absence of the need to break off the leg 7, 107 or 207 is desirable on the additional ground that the application of improved clamp to hoses or the like does not entail a contamination of the surrounding area by broken-off fragments of straps.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A clamp for hoses of the like, comprising an elongated strap including a toothed loop-shaped intermediate portion, a toothed first end portion overlapped by and meshing with said intermediate portion, and a second end portion extending from said intermediate portion and comprising a bendable tensioning projection extending outwardly in a direction away from said intermediate portion and having a first face extending substantially transversely of said strap, said second end portion further including an integral protuberance offset with respect to the general plane of said second end portion, extending toward said intermediate portion and having a second face adjacent to said first face and arranged to oppose bending of said projection when the projection is urged in a direction to reduce the size of said intermediate portion, said projection constituting a folded-over part of said second end portion and including two mutually inclined legs one of which extends outwardly and the other of which includes a panel provided with said first face and disposed at that side of said second end portion which faces said intermediate portion.

2. The clamp of claim 1, wherein said second end portion has a slot flanking a portion of said protuberance.

3. The clamp of claim 1, wherein said second end portion has a shoulder extending transversely of said strap and constituting said second face.

4. The clamp of claim 3, wherein said second end portion has a side facing said intermediate portion and said shoulder is provided at said side of said second end portion.

5. The clamp of claim 1, wherein said strap consists of a metallic material and said first end portion has guide means through and beyond which said second end portion extends.

6. The clamp of claim 1, wherein said first end portion has an abutment for the application of one portion of a tensioning tool another portion of which bears against said projection during a reduction of the size of said intermediate portion.

7. The clamp of claim 1, wherein the width of said strap is less than one centimeter and the thickness of said strap is less than one millimeter.

* * * * *